US012618577B2

(12) United States Patent
Nakajima et al.

(10) Patent No.: US 12,618,577 B2
(45) Date of Patent: May 5, 2026

(54) AIR-CONDITIONING LIGHTING CONTROL SYSTEM AND AIR-CONDITIONING LIGHTING SYSTEM

(71) Applicant: Mitsubishi Electric Corporation, Tokyo (JP)

(72) Inventors: Yoshinori Nakajima, Tokyo (JP); Hiroaki Sakaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 376 days.

(21) Appl. No.: 18/547,921

(22) PCT Filed: Apr. 26, 2021

(86) PCT No.: PCT/JP2021/016611
§ 371 (c)(1),
(2) Date: Aug. 25, 2023

(87) PCT Pub. No.: WO2022/230011
PCT Pub. Date: Nov. 3, 2022

(65) Prior Publication Data

US 2024/0133569 A1 Apr. 25, 2024
US 2024/0230126 A9 Jul. 11, 2024

(51) Int. Cl.
*F24F 11/32* (2018.01)
*F24F 5/00* (2006.01)
(Continued)

(52) U.S. Cl.
CPC ............ *F24F 11/32* (2018.01); *F24F 5/0096* (2013.01); *F24F 11/54* (2018.01); *F24F 11/61* (2018.01); *H05B 47/16* (2020.01); *F24F 2221/02* (2013.01)

(58) Field of Classification Search
CPC ...................... G05B 15/02; G05B 2219/2642; G05B 13/02; G05B 23/0243; G08C 17/00; G08C 2201/50; H04N 7/15
See application file for complete search history.

(56) References Cited

U.S. PATENT DOCUMENTS

2003/0103075 A1* 6/2003 Rosselot ................ H04L 41/22 348/E7.083
2008/0275573 A1* 11/2008 Shimba ................ G08C 17/00 700/19

(Continued)

FOREIGN PATENT DOCUMENTS

JP 3464302 B2 11/2003
JP 2009-191575 A 8/2009

(Continued)

OTHER PUBLICATIONS

International Search Report of the International Searching Authority mailed Jul. 27, 2021 in corresponding International Application No. PCT/JP2021/016611 (and English translation).

*Primary Examiner* — Darrin D Dunn
(74) *Attorney, Agent, or Firm* — Posz Law Group, PLC

(57) ABSTRACT

An air-conditioning lighting control system includes air-conditioning control circuitry configured to control an air-conditioning apparatus on the basis of an air-conditioning map indicating an air-conditioning target space and the air-conditioning apparatus provided in the air-conditioning target space, lighting control circuitry configured to control a lighting device on the basis of a lighting map indicating an illuminating target space and the lighting device provided in the illuminating target space, centralized control circuitry configured to communicate with the air-conditioning control circuitry and the lighting control circuitry and make the air-conditioning apparatus and the lighting device work in conjunction with each other on the basis of linkage infor- (Continued)

mation, which is set in advance, and in which the air-conditioning apparatus and the lighting device are linked with each other, and detection circuitry configured to detect that there is a setting error in the air-conditioning map, the lighting map, or the linkage information.

12 Claims, 6 Drawing Sheets

(51) Int. Cl.

| | |
|---|---|
| ***F24F 11/54*** | (2018.01) |
| ***F24F 11/61*** | (2018.01) |
| ***H05B 47/16*** | (2020.01) |

(56) References Cited

U.S. PATENT DOCUMENTS

| | | | | |
|---|---|---|---|---|
| 2012/0296478 | A1 | 11/2012 | Ogura et al. | |
| 2013/0184892 | A1* | 7/2013 | Mohan | G05B 13/02 700/297 |
| 2018/0351759 | A1 | 12/2018 | Kishimoto et al. | |
| 2019/0310616 | A1* | 10/2019 | Reichl | G05B 23/0243 |

FOREIGN PATENT DOCUMENTS

| | | | |
|---|---|---|---|
| JP | 2018-206516 | A | 12/2018 |
| JP | 2021-055947 | A | 4/2021 |
| WO | 2011/099075 | A1 | 8/2011 |

* cited by examiner

AIR-CONDITIONING LIGHTING CONTROL SYSTEM AND AIR-CONDITIONING LIGHTING SYSTEM

CROSS REFERENCE TO RELATED APPLICATION

This application is a U.S. national stage application of PCT/JP2021/016611 filed on Apr. 26, 2021, the contents of which are incorporated herein by reference.

TECHNICAL FIELD

The present disclosure relates to an air-conditioning lighting control system and an air-conditioning lighting system that make an air-conditioning apparatus and a lighting device work in conjunction with each other.

BACKGROUND ART

An air-conditioning lighting control system that makes an air-conditioning apparatus and a light device work in conjunction with each other has been known. Patent Literature 1 discloses an air-conditioning lighting control system that collectively manages facility equipment, such as air-conditioning apparatuses and lighting devices, provided in the same room in a building facility.

CITATION LIST

Patent Literature

Patent Literature 1: Japanese Patent No. 3464302

SUMMARY OF INVENTION

Technical Problem

However, in such an air-conditioning lighting control system, a user needs to make the settings for a plurality of air-conditioning apparatuses and lighting devices, and thus the user may make a mistake. For example, the user sometimes forgets to set a linkage between an air-conditioning apparatus and a lighting device, or the user sometimes links a lighting device with an incorrect air-conditioning apparatus installed in a different room. As described above, in the air-conditioning lighting control system, a setting error may occur when a linkage function is set between an air-conditioning apparatus and a lighting device.

The present disclosure has been made to overcome the above-mentioned problem, and has an object to make an air-conditioning apparatus and a lighting device correctly work in conjunction with each other in an air-conditioning lighting control system and in an air-conditioning lighting system.

Solution to Problem

An air-conditioning lighting control system according to an embodiment of the present disclosure includes air-conditioning control circuitry configured to control an air-conditioning apparatus on the basis of an air-conditioning map indicating an air-conditioning target space and the air-conditioning apparatus provided in the air-conditioning target space, lighting control circuitry configured to control a lighting device on the basis of a lighting map indicating an illuminating target space and the lighting device provided in the illuminating target space, centralized control circuitry configured to communicate with the air-conditioning control circuitry and the lighting control circuitry and make the air-conditioning apparatus and the lighting device work in conjunction with each other on the basis of linkage information, which is set in advance, and in which the air-conditioning apparatus and the lighting device are linked with each other, and detection circuitry configured to detect that there is a setting error in the air-conditioning map, the lighting map, or the linkage information.

Advantageous Effects of Invention

The air-conditioning lighting control system and the air-conditioning lighting system according to embodiments of the present disclosure include the detection circuitry configured to detect a setting error in the air-conditioning map, the lighting map, or the linkage information. Therefore, by the air-conditioning lighting control system and the air-conditioning lighting system according to embodiments of the present disclosure, an air-conditioning apparatus and a lighting device can be made to correctly work in conjunction with each other.

DESCRIPTION OF EMBODIMENTS

Embodiment 1

Figure 1:
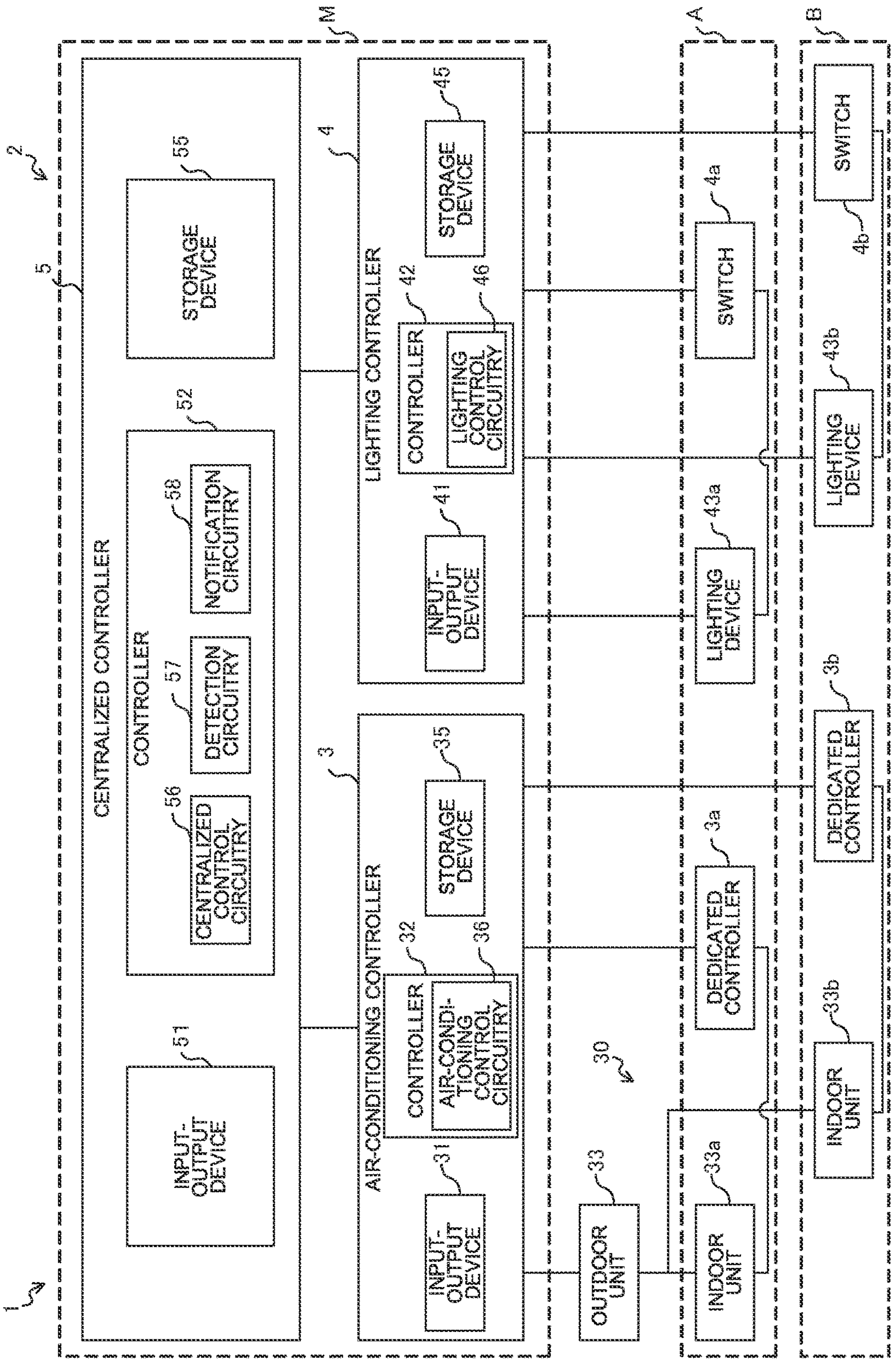
FIG. 1 is a block diagram illustrating a schematic configuration of an air-conditioning lighting system 1 according to Embodiment 1.

Embodiment 1 will be described below with reference to the drawings. An air-conditioning lighting system 1 of Embodiment 1 is provided in, for example, a building facility. FIG. 1 is a block diagram illustrating a schematic configuration of the air-conditioning lighting system 1 according to Embodiment 1. As shown in FIG. 1, the air-conditioning lighting system 1 includes an air-conditioning controller 3, a lighting controller 4, a centralized controller 5, an air-conditioning apparatus 30, lighting devices **43*a* and 43*b*, dedicated controllers 3*a* and 3*b*, and switches 4*a* and 4*b*. In addition, an outdoor unit 33 of the air-conditioning apparatus 30** is provided outside the building facility. In a room A of the building facility, an indoor unit 33*a* of the air-conditioning apparatus 30, the dedicated controller 3*a*, the lighting device 43*a*, and the switch 4*a* are provided. In a room B of the building facility, an indoor unit 33*b* of the air-conditioning apparatus 30, the dedicated controller 3*b*, the lighting device 43*b*, and the switch 4*b* are provided. The air-conditioning controller 3, the lighting controller 4, and the centralized controller 5 are provided in, for example, a control room M, and form an air-conditioning lighting control system 2 that comprehensively manages the air-conditioning apparatus 30 and the lighting devices 43*a* and 43*b* in the facility.

The air-conditioning controller 3 is configured to comprehensively control operations of the outdoor unit 33 and the indoor units 33*a* and 33*b*. The air-conditioning controller 3 is dedicated hardware or a terminal device, such as a personal computer (PC), that includes an input-output device 31, a controller 32, and a storage device 35. The air-conditioning controller 3 is connected to the outdoor unit 33 via a dedicated communication line or a local area network (LAN). The outdoor unit 33 is connected to each of the indoor units 33*a* and 33*b* via a dedicated communication line or a LAN. In addition, the air-conditioning controller 3 is connected to the centralized controller 5 via a dedicated communication line or a LAN.

The input-output device 31 of the air-conditioning controller 3 is, for example, a touch panel type display. The input-output device 31 is configured to receive an operation input from a manager or a similar user, and also display operation statuses of the outdoor unit 33 and the indoor units 33*a* and 33*b*.

The controller 32 of the air-conditioning controller 3 is a central processing unit (CPU) or a similar device that executes programs. The controller 32 includes air-conditioning control circuitry 36. The air-conditioning control circuitry 36 is formed by software, firmware, or a combination of software and firmware. The air-conditioning control circuitry 36 is configured to transmit, to the outdoor unit 33 and the indoor units 33*a* and 33*b*, signals that control operation and stop of the outdoor unit 33 and the indoor units 33*a* and 33*b* on the basis of an operation input received by the input-output device 31 from the manager or a similar user. Alternatively, the air-conditioning control circuitry 36 is configured to transmit, to the outdoor unit 33 and the indoor units 33*a* and 33*b*, signals that control operation and stop of the outdoor unit 33 and the indoor units 33*a* and 33*b* when the air-conditioning control circuitry 36 receives control information from the centralized controller 5. Furthermore, the air-conditioning control circuitry 36 of the air-conditioning controller 3 is configured to receive signals indicating operation statuses from the outdoor unit 33 and the indoor units 33*a* and 33*b*.

The air-conditioning control circuitry 36 of the air-conditioning controller 3 is configured to control the indoor units 33*a* and 33*b* on the basis of an air-conditioning map. The air-conditioning map is information indicating a plurality of air-conditioning target spaces, and the indoor units 33*a* and 33*b* of the air-conditioning apparatus 30 provided in the respective air-conditioning target spaces. Each air-conditioning target space is a space to be air-conditioned by the indoor unit 33*a* or 33*b*, and corresponds to the room A or B in the present embodiment. The air-conditioning controller 3 is configured to assign a unique identification number to each air-conditioning target space. In the air-conditioning map, each identification number is stored corresponding to an individual number of the corresponding one of the indoor units 33*a* and 33*b*. More specifically, in the present embodiment, the air-conditioning map includes information indicating that the room A and the indoor unit 33*a* are associated with each other, and the room B and the indoor unit 33*b* are associated with each other. As described above, the air-conditioning map includes a correspondence relationship between the air-conditioning target spaces and the indoor units 33*a* and 33*b*. The air-conditioning map is created by an operator or a similar person at the time of installing the air-conditioning apparatus 30, for example.

The storage device 35 of the air-conditioning controller 3 is, for example, a random access memory (RAM), a read-only memory (ROM), a flash memory, an erasable programmable read-only memory (EPROM), an electrically erasable programmable read-only memory (EEPROM), or other types of non-volatile or volatile semiconductor memory. In the storage device 35, the air-conditioning map and an air-conditioning log are stored. The air-conditioning log is a cumulative record of signals that control operation and stop of the air-conditioning apparatus 30 and results of the controls of the air-conditioning apparatus 30 exercised on the basis of the signals. In addition, signals transmitted by the dedicated controllers 3*a* and 3*b* to the indoor units 33*a* and 33*b*, and results of the controls exercised on the basis of the signals are also recorded in the air-conditioning log. Note that, the control results include data on success or failure of receiving each signal by the air-conditioning apparatus 30, and data on an operation status after the air-conditioning apparatus 30 receives the signal.

The dedicated controllers 3*a* and 3*b* are each connected to the air-conditioning controller 3 via a dedicated communication line or a LAN. The outdoor unit 33 and the indoor units 33*a* and 33*b* are controlled not only by the air-conditioning controller 3 but also by the dedicated controllers 3*a* and 3*b*. The dedicated controller 3*a* is installed on, for example, a wall of the room A, and connected to the indoor unit 33*a* via a dedicated communication line or a LAN. When the dedicated controller 3*a* receives an operation input from a user or a similar person, the dedicated controller 3*a* transmits a signal that controls operation or stop of the corresponding indoor unit 33*a* to the indoor unit 33*a*. In addition, the dedicated controller 3*a* receives an operation status of the indoor unit 33*a* and displays the operation status on a screen. Furthermore, the dedicated controller 3*a* transmits a signal indicating the control result to the air-conditioning controller 3. The dedicated controller 3*b* performs the same operations as those of the dedicated controller 3*a* for the indoor unit 33*b* in the room B.

The lighting controller 4 is configured to comprehensively control operations of the lighting devices 43*a*. The lighting controller 4 is dedicated hardware or a terminal device, such as a PC, that includes an input-output device 41, a controller 42, and a storage device 45. The lighting controller 4 is connected to each of the lighting devices 43*a* and 43*b* via a dedicated communication line or a LAN. In addition, the lighting controller 4 is connected to the centralized controller 5 via a dedicated communication line or a LAN.

The input-output device 41 of the lighting controller 4 is, for example, a touch panel type display. The input-output device 41 is configured to receive an operation input from the manager or a similar user, and also display lighting statuses of the lighting devices 43*a* and 43*b*.

The controller 42 of the lighting controller 4 is a CPU or a similar device that executes programs. The controller 42 includes lighting control circuitry 46. The lighting control circuitry 46 is formed by software, firmware, or a combination of software and firmware. The lighting control circuitry 46 is configured to transmit, to the lighting devices 43*a* and 43*b*, signals that control turning on and off of the lighting devices 43*a* and 43*b* on the basis of an operation input received by the input-output device 41 from the manager or a similar user. In addition, the lighting control circuitry 46 is configured to transmit, to the lighting devices 43*a* and 43*b*, signals that control turning on and off of the lighting devices 43*a* and 43*b* when the lighting control circuitry 46 receives control information from the centralized controller 5. Furthermore, the lighting control circuitry 46 of the air-conditioning controller 3 is configured to receive signals indicating lighting statuses from the lighting devices 43*a* and 43*b*.

The lighting control circuitry 46 of the lighting controller 4 is configured to control the lighting devices 43*a* and 43*b* on the basis of a lighting map. The lighting map is information indicating a plurality of illuminating target spaces, and the lighting devices 43*a* and 43*b* provided in the respective illuminating target spaces. Each illuminating target space is a space to be illuminated by the lighting device 43*a* or 43*b*, and corresponds to the room A or B in the present embodiment. The lighting controller 4 is configured to assign a unique identification number to each illuminating target space. In the lighting map, each identification number is stored corresponding to an individual number of the corresponding one of the lighting devices 43*a* and 43*b*. More specifically, in the present embodiment, the lighting map includes information indicating that the room A and the lighting device 43*a* are associated with each other, and the room B and the lighting device 43*a* are associated with each other. As described above, the lighting map includes a correspondence relationship between the illuminating target spaces and the lighting devices 43*a* and 43*b*. The lighting map is created by an operator or a similar person at the time of installing the lighting devices 43*a* and 43*b*, for example.

The storage device 45 of the lighting controller 4 is, for example, a RAM, a ROM, a flash memory, an EPROM, an EEPROM, or other types of non-volatile or volatile semiconductor memory. In the storage device 45, the lighting map and a lighting log are stored. The lighting log is a cumulative record of signals that control tuming on and off of the lighting devices 43*a* and 43*b* and results of the controls of the lighting devices 43*a* and 43*b* exercised on the basis of the signals. In addition, signals transmitted by the switches 4*a* and 4*b* to the lighting devices 43*a* and 43*b*, and results of the controls exercised on the basis of the signals are also recorded in the lighting log. Note that, the control results include data on success or failure of receiving signals by the lighting devices 43*a* and 43*b*, and data on lighting statuses after the lighting devices 43*a* and 43*b* receives the signals.

The switches 4*a* and 4*b* are each connected to the lighting controller 4 via a dedicated communication line or a LAN. The lighting devices 43*a* and 43*b* are controlled not only by the lighting controller 4 but also by the switches 4*a* and 4*b*, each dedicated for the corresponding lighting device 43*a* or 43*b*. The switch 4*a* is installed on, for example, a wall of the room A, and connected to the lighting device 43*a* via a dedicated communication line or a LAN. When the switch 4*a* receives an operation input from a user or a similar person, the switch 4*a* transmits a signal that controls turning on or off of the corresponding lighting device 43*a* to the lighting device 43*a*. The switch 4*a* transmits a signal indicating the control result to the lighting controller 4. The switch 4*b* performs the same operations as those of the switch 4*a* for the lighting device 43*b* in the room B.

The centralized controller 5 is dedicated hardware or a terminal device, such as a PC, that includes an input-output device 51, a controller 52, and a storage device 55. The centralized controller 5 is communicably connected to each of the air-conditioning controller 3 and the lighting controller 4 via a dedicated communication line or a LAN.

The centralized controller 5 is configured to make the indoor units 33*a* and 33*b* of the air-conditioning apparatus and the lighting devices 43*a* and 43*b* work in conjunction with each other on the basis of linkage information in which the indoor units 33*a* and 33*b* of the air-conditioning apparatus 30 and the lighting devices 43*a* and 43*b* are linked. The linkage information is set by the manager, a user, or a similar person and stored in the storage device 55. When an air-conditioning target space is the same as an illuminating target space, the manager or a similar person sets linkage information to perform starting and stopping of the indoor unit 33*a* or 33*b* provided in the air-conditioning target space in conjunction with turning on and turning off of the lighting device 43*a* or 43*b* provided in the illuminating target space. With this setting, starting and stopping of the indoor unit 33*a* of the air-conditioning apparatus 30 and turning on and turning off of the lighting device 43*a* installed in the same room A are performed in conjunction with each other. Similarly, starting and stopping of the indoor unit 33*b* of the air-conditioning apparatus 30 and turning on and turning off of the lighting device 43*b* installed in the same room B are performed in conjunction with each other. Examples of such a linked operation include an operation in which the indoor unit 33*a* is automatically started when a user enters the room A and turns on the lighting device 43*a* installed in the room A by using the switch 4*a*. To simplify the description below, there is a case where a state in which the indoor unit 33*a* or 33*b* is started and operated and a state in which the lighting device 43*a* or 43*b* is turned on are both referred to as the on state. Similarly, there is a case where a state in which the indoor unit 33*a* or 33*b* is stopped and a state in which the lighting device 43*a* or 43*b* is turned off are both referred to as an off state.

The input-output device 51 of the centralized controller 5 is, for example, a touch panel type display. The input-output device 51 is configured to receive an operation input from the manager or a similar user, and also display, for example, an operation status of the air-conditioning apparatus 30 as well as lighting statuses of the lighting devices 43*a* and 43*b* on the basis of the information received from the air-conditioning controller 3 and the lighting controller 4.

The controller 52 of the centralized controller 5 includes, as pieces of functional circuitry, centralized control circuitry 56, detection circuitry 57, and notification circuitry 58. The controller 52 is a CPU or a similar device that executes programs. Each of the pieces of functional circuitry is formed by software, firmware, or a combination of software and firmware.

The centralized control circuitry 56 is configured to make the indoor unit 33*a* of the air-conditioning apparatus 30 and the lighting device 43*a* work in conjunction with each other as well as make the indoor unit 33*b* and the lighting device 43*b* work in conjunction with each other by controlling the air-conditioning controller 3 and the lighting controller 4 on the basis of the linkage information stored in the storage device 55. The centralized control circuitry 56 is configured to receive the air-conditioning map from the air-conditioning controller 3 and the lighting map from the lighting controller 4 when the air-conditioning map and the lighting map are set or changed, for example. In addition, when, for example, control is exercised by one of the air-conditioning controller 3, the lighting controller 4, the centralized controller 5, the dedicated controllers 3*a* and 3*b*, and the switches 4*a* and 4*b*, the centralized control circuitry 56 is configured to receive the air-conditioning log from the air-conditioning controller 3 and the lighting log from the lighting controller 4.

The centralized control circuitry 56 is configured to display, for example, the operation status of the air-conditioning apparatus 30 as well as the lighting statuses of the lighting devices 43*a* and 43*b* on the input-output device 51 on the basis of the air-conditioning map, the air-conditioning log, the lighting map, and the lighting log. The air-conditioning map, the air-conditioning log, the lighting map, and the lighting log received by the centralized control circuitry 56 are stored in the storage device 55.

The detection circuitry 57 is configured to detect that there is a setting error in the linkage information. The setting error indicates that the linkage information includes a condition that the manager, a user, and a similar person do not intend. One example of the setting errors is a condition in which the indoor units 33*a* and 33*b* of the air-conditioning apparatus 30 are not linked with the lighting devices 43*a* and 43*b* by mistake. Another example is a condition in which the indoor unit 33*a* of an air-conditioning apparatus 30 is linked with the lighting device 43*b* provided in the room B, which is different from the room where the indoor unit 33*a* is provided, and thus the indoor unit 33*a* and the lighting device 43*b* are mistakenly made to work in conjunction with each other. In consideration of the fact that a plurality of indoor units 33*a* and 33*b* of the air-conditioning apparatus 30 and the lighting devices 43*a* and 43*b* are managed and that a plurality of controllers are utilized in the management, setting errors are inevitable when the manager or a similar person sets the linkage information.

To detect a setting error, the detection circuitry 57 performs the following operations. When an air-conditioning target space and an illuminating target space are the same room, the detection circuitry 57 sets the indoor unit 33*a* or 33*b* provided in the air-conditioning target space and the lighting device 43*a* or 43*b* provided in the illuminating target space into the same control group on the basis of the air-conditioning map and the lighting map. Whether or not the spaces are the same room is determined by using an identification number system or a similar system in which identification numbers are given to the air-conditioning target spaces and the illuminating target spaces. The setting of a control group is made by the detection circuitry 57 when the air-conditioning map and the lighting map are set or changed, for example. The set control group is stored in the storage device 55.

Then, the detection circuitry 57 determines operation statuses of the indoor units 33*a* and 33*b* of the air-conditioning apparatus 30 and those of the lighting devices 43*a* and 43*b* on the basis of the air-conditioning log and the lighting log. When the determination result indicates that the indoor units 33*a* and 33*b* of the air-conditioning apparatus 30 and the lighting device 43*a*, which are set in the same control group, are operating in different time periods, the detection circuitry 57 detects a setting error in the linkage information. Specific detection patterns and criterion for detecting setting errors are determined by the manager, a user, and a similar person on the basis of actual usage conditions of the air-conditioning apparatus 30 and the lighting device 43*a*, and detection patterns and criterion that are considered to be suited are set in advance. The determination of operation statuses and the detection of setting errors are performed by the detection circuitry 57 at a predetermined timing, for example, at 22:00 every day.

A specific timing for detection may be changed on the basis of a detection result. For example, when the timing for detection is set to an interval of a first time period and no setting error is found in the determination once, the timing for detection is changed to an interval of a second time period, which is longer than the first time period. However, when the timing for detection is set to the interval of the second time period and the linkage information is changed, the timing for detection is changed to the interval of the first time period.

The notification circuitry 58 is configured to report the setting error in the linkage information detected by the detection circuitry 57. As a way of report, a notification screen is displayed on the input-output device 51 of the centralized controller 5. Note that, when the notification screen is displayed, the notification may be given also by sound. The notification screen includes, for example, information that informs the manager or a similar user of the possibility of the setting error. The notification screen also includes information showing the content of the setting error on the basis of a detection pattern.

The storage device 55 of the centralized controller 5 is, for example, a RAM, a ROM, a flash memory, an EPROM, an EEPROM, or other types of non-volatile or volatile semiconductor memory. The storage device 55 stores the linkage information set by the manager, a user, or a similar user. The storage device 55 also stores the air-conditioning map, the air-conditioning log, the lighting map, and the lighting log received by the centralized control circuitry 56. In addition, the storage device 55 stores the control groups set by the detection circuitry 57.

Next, first to third detection patterns will be described below as examples of detection patterns. In the following description, a case where the air-conditioning apparatus 30 and the lighting devices 43*a* and 43*b* are arranged as shown in FIG. 1 is used as an example. That is, the indoor unit 33*a* of the air-conditioning apparatus 30 and the lighting device 43*a* are provided in the room A of the building facility. In addition, the indoor unit 33*b* of the air-conditioning apparatus 30 and the lighting device 43*b* are provided in the room B.

Figure 2:
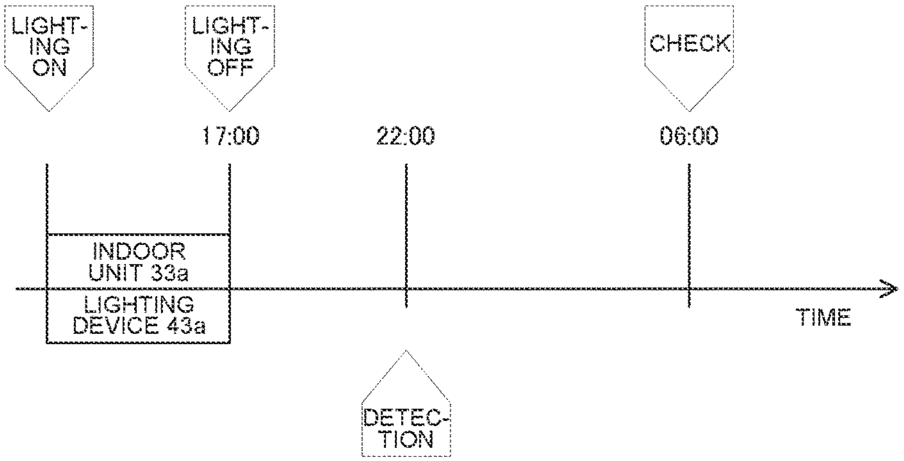
FIG. 2 is a diagram explaining a first detection pattern according to Embodiment 1.
Figure 3:
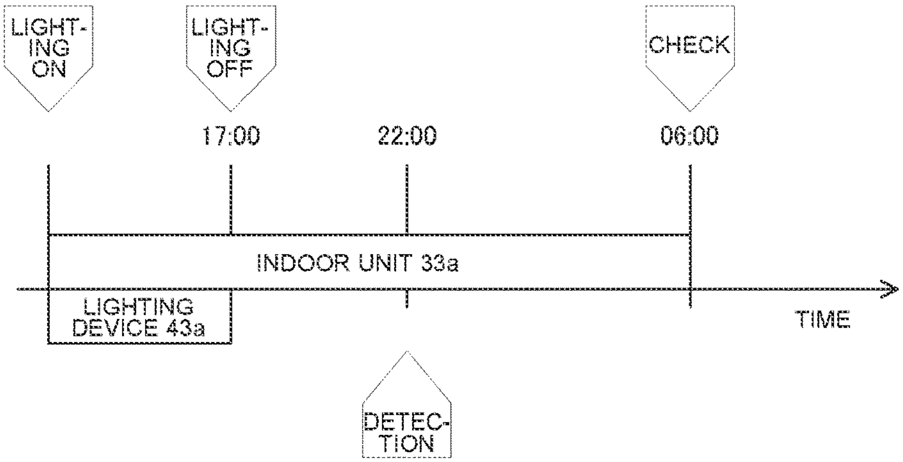
FIG. 3 is another diagram explaining the first detection pattern according to Embodiment 1.

FIG. 2 is a diagram explaining a first detection pattern of the detection circuitry 57 according to Embodiment 1. FIG. 3 is another diagram explaining the first detection pattern of the detection circuitry 57 according to Embodiment 1. FIG. 2 shows a case where the linkage information is set such that the indoor unit 33*a* and the lighting device 43*a* work in conjunction with each other. Meanwhile, FIG. 3 shows a case where the manager forgets to set the linkage between the indoor unit 33*a* and the lighting device 43*a*. In the first detection pattern, the operation statuses of the indoor unit 33*a* and the lighting device 43*a* are determined at a predetermined time, which is set in advance for the room A, and a setting error is detected when the indoor unit 33*a* or the lighting device 43*a* is not in an the off state. The predetermined time is a time at which the room A is not considered to be normally used, such as night. In this case, the predetermined time is 22:00.

In the case of FIG. 2, when a user turns off the lighting device 43*a* and leaves the room A at 17:00, the indoor unit 33*a* of the air-conditioning apparatus 30 is stopped in conjunction with the lighting device 43*a*. Because the lighting device 43*a* and the indoor unit 33*a* are in the off states at 22:00, it is determined that there is no setting error, and thus no notification is performed. In the case of FIG. 3, a user turns off the lighting device 43*a* and leaves the room A at 17:00, but the indoor unit 33*a* is still running even at 22:00. Because the air-conditioning log does not indicate that the operation of the indoor unit 33*a* has been stopped even at the predetermined time, the detection circuitry 57 detects a setting error. Furthermore, the notification circuitry 58 reports occurrence of the setting error, and reports, as the content of the setting error, that the operation of the indoor unit 33*a* has not been stopped even at the predetermined time. Thus, the manager or a similar user can check the report of the notification circuitry 58 on the next morning or any time of day, and can take measures to correct the linkage information.

Figure 4:
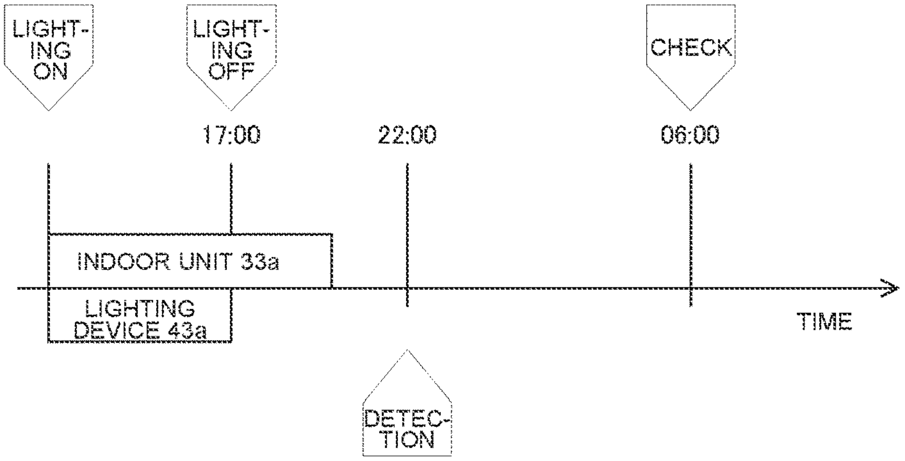
FIG. 4 is a diagram explaining a second detection pattern according to Embodiment 1.

FIG. 4 is a diagram explaining a second detection pattern of the detection circuitry 57 according to Embodiment 1. As with FIG. 3, FIG. 4 shows a case where the manager forgets to set the linkage between the indoor unit 33*a* and the lighting device 43*a*. However, unlike FIG. 3, the operation of the indoor unit 33*a* has been stopped before the predetermined time. In the second detection pattern, when the indoor unit 33*a* of the air-conditioning apparatus 30 and the lighting device 43*a*, which are provided in the room A and set in the same control group, are stopped at different timings, a setting error is detected. In FIG. 4, a user turns off the lighting device 43*a* and leaves the room A at 17:00, but the operation of the indoor unit 33*a* is not stopped in conjunction with the lighting device 43*a*. Because the air-conditioning log and the lighting log indicate that the indoor unit 33*a* and the lighting device 43*a* entered the off states at different timings, the detection circuitry 57 detects a setting error. Furthermore, the notification circuitry 58 reports occurrence of the setting error, and reports, as the content of the setting error, that the operation of the indoor unit 33*a* was not stopped when the lighting device 43*a* was turned off.

Figure 5:
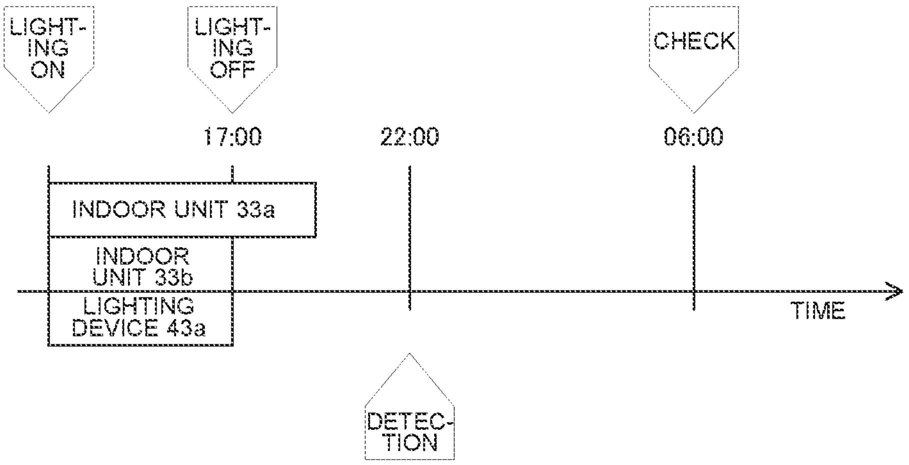
FIG. 5 is a diagram explaining a third detection pattern according to Embodiment 1.

FIG. 5 is a diagram explaining a third detection pattern of the detection circuitry 57 according to Embodiment 1. FIG. 5 shows a case where the indoor unit 33*a* and the lighting device 43*b* are mistakenly linked. In the third detection pattern, when the indoor unit 33*a* and the lighting device 43*a*, which are set in the same control group, 10 stop at different timings, and the indoor unit 33*a* and the lighting device 43*b* that is not set in the same control group as is the indoor unit 33*a* stop at the same timing, a setting error is detected. In FIG. 5, a user turns off the lighting device 43*a* and leaves the room A at 17:00, but the operation of the indoor unit 33*b*, instead of the indoor unit 33*a*, is stopped in conjunction with the lighting device 43*a*. Because the air-conditioning log 15 and the lighting log indicate that the indoor unit 33*a* and the lighting device 43*a* were turned off at different timings and the indoor unit 33*b* and the lighting device 43*a* were turned off at the same timing, the detection circuitry 57 detects a setting error. Furthermore, the notification circuitry 58 reports occurrence of the setting error, and reports, as the content of the setting error, that the operation of the indoor unit 33*b*, 20 instead of the indoor unit 33*a*, was stopped when the lighting device 43*a* was turned off.

Figure 6:
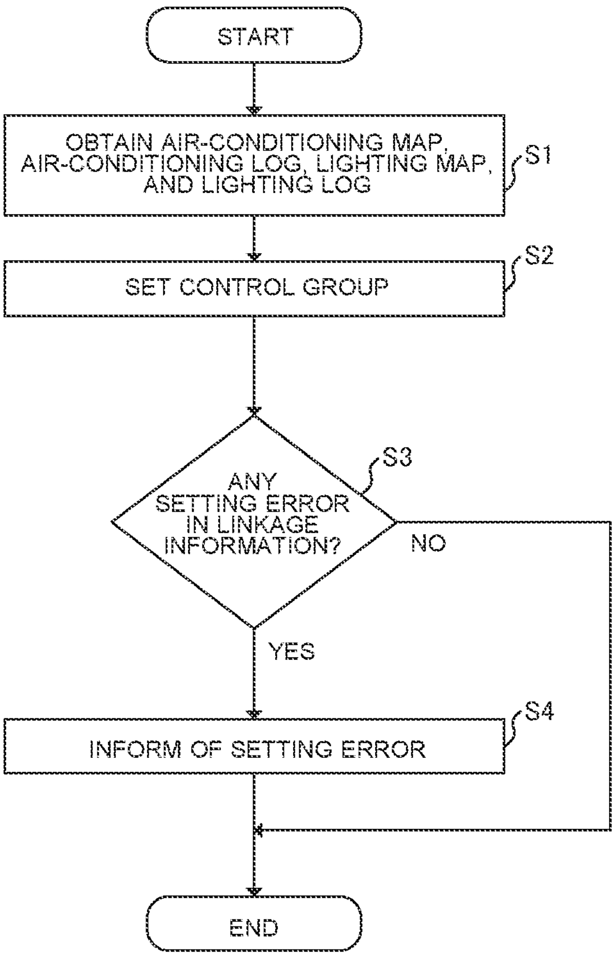
FIG. 6 is a flowchart illustrating an operation of a controller 52 of a centralized controller 5 according to Embodiment 1.

FIG. 6 is a flowchart illustrating an operation of the controller 52 of the centralized controller 5 according to Embodiment 1. The operation of the controller 52 of the centralized controller 5 will be described with reference to FIG. 6. As a preliminary step, the centralized control circuitry 56 obtains the air-conditioning map, the air-conditioning log, the lighting log, and the lighting map from the air-conditioning controller 3 and the lighting controller 4 (S1), and stores the maps and logs in the storage device 55. The detection circuitry 57 sets a control group (S2), and stores the control group in the storage device 55. At the predetermined time, the detection circuitry 57 determines whether or not a setting error corresponding to a detection pattern is present in the linkage information on the basis of the air-conditioning log and the lighting log stored in the storage device 55 (S3). When the detection circuitry 57 determines that there is no setting error in the linkage information (NO in S3), the processing is ended. When the detection circuitry 57 determines that there is a setting error in the linkage information (YES in S3), the notification circuitry 58 reports the setting error (S4), and the processing is ended.

The air-conditioning lighting control system 2 and the air-conditioning lighting system 1 of Embodiment 1 include the detection circuitry 57 configured to detect a setting error in the linkage information. Therefore, in the air-conditioning lighting control system 2 and the air-conditioning lighting system 1 of Embodiment 1, the indoor units 33*a* and 33*b* of the air-conditioning apparatus 30 and the lighting devices 43*a* and 43*b* are made to correctly work in conjunction with each other. In addition, with this feature, the manager can correct the linkage information before a user or a similar person makes a complaint.

Embodiment 2

Figure 7:
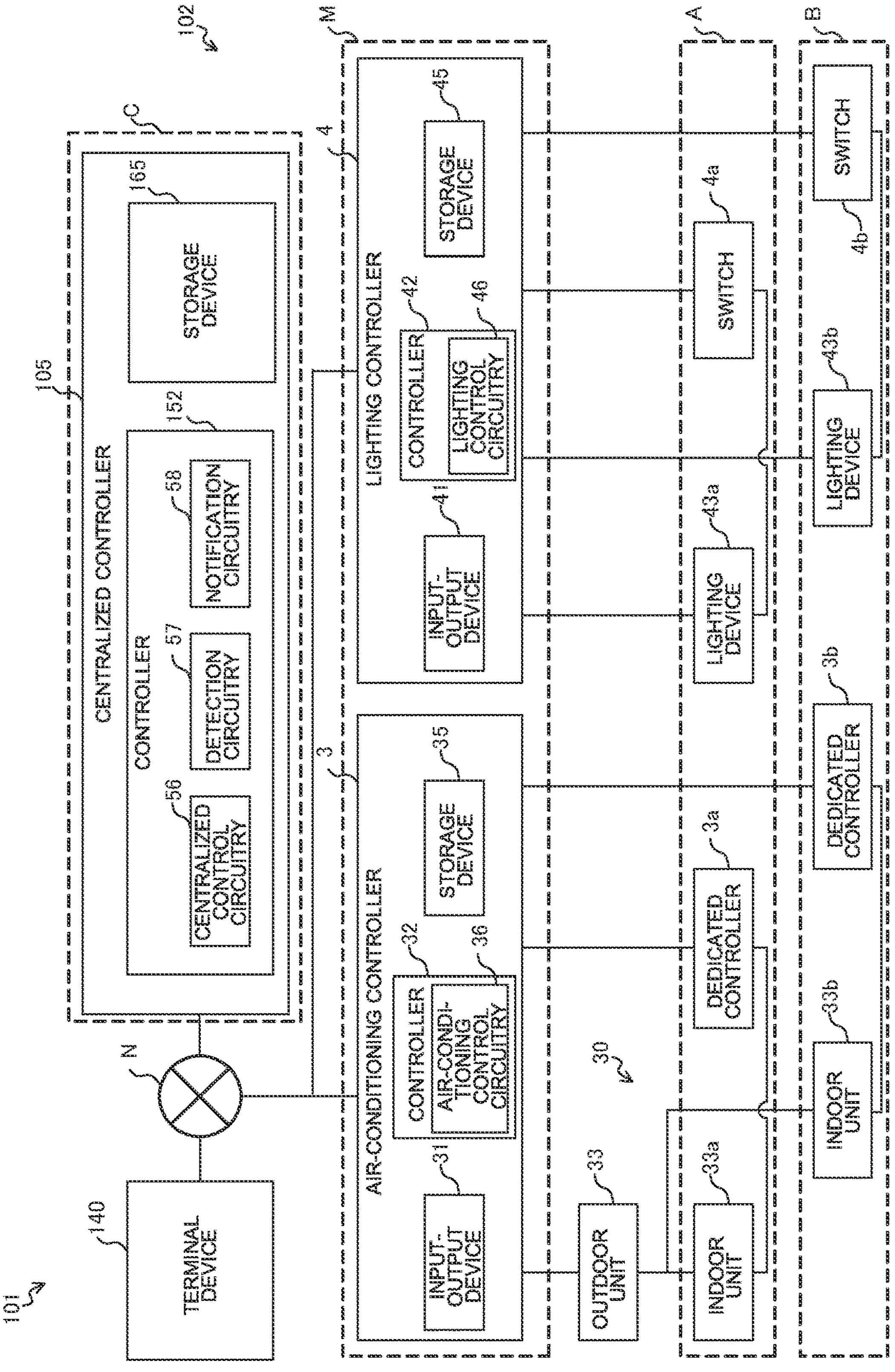
FIG. 7 is a block diagram illustrating a schematic configuration of an air-conditioning lighting system 101 according to Embodiment 2.

FIG. 7 is a block diagram illustrating a schematic configuration of an air-conditioning lighting system 101 according to Embodiment 2. An air-conditioning lighting control system 102 of Embodiment 2 differs from that of Embodiment 1 in that a centralized controller 105 can be used via an external network N. The components in common with Embodiment 1 will be denoted by the same reference signs, and their descriptions will be omitted. Features different from Embodiment 1 will be mainly described below.

As shown in FIG. 7, the centralized controller 105 is provided in the cloud C, which is outside the air-conditioning controller 3 and the lighting controller 4. More specifically, the centralized control circuitry 56, the detection circuitry 57, and the notification circuitry 58 of the centralized controller 105 are mounted in a controller 152, which is a CPU or a similar device of the cloud server. The centralized control circuitry 56 of the centralized controller 105 is configured to store the linkage information, the air-conditioning map, the air-conditioning log, the lighting map, the lighting log, and the control groups in a storage device 165 of the cloud server. Communication between the centralized controller 105 and the air-conditioning controller 3 and communication between the centralized controller 105 and the lighting controller 4 are performed via the external network N. Each of the pieces of functional circuitry of the centralized controller 105 can be used from a terminal device 140 or a similar device via the external network N. Therefore, with the air-conditioning lighting control system 102 and the air-conditioning lighting system 101 of Embodiment 2, when the detection circuitry 57 detects an error in the linkage information, an operator can correct the setting of the linkage information for the air-conditioning and lighting without going to the building facility.

Embodiment 3

Figure 8:
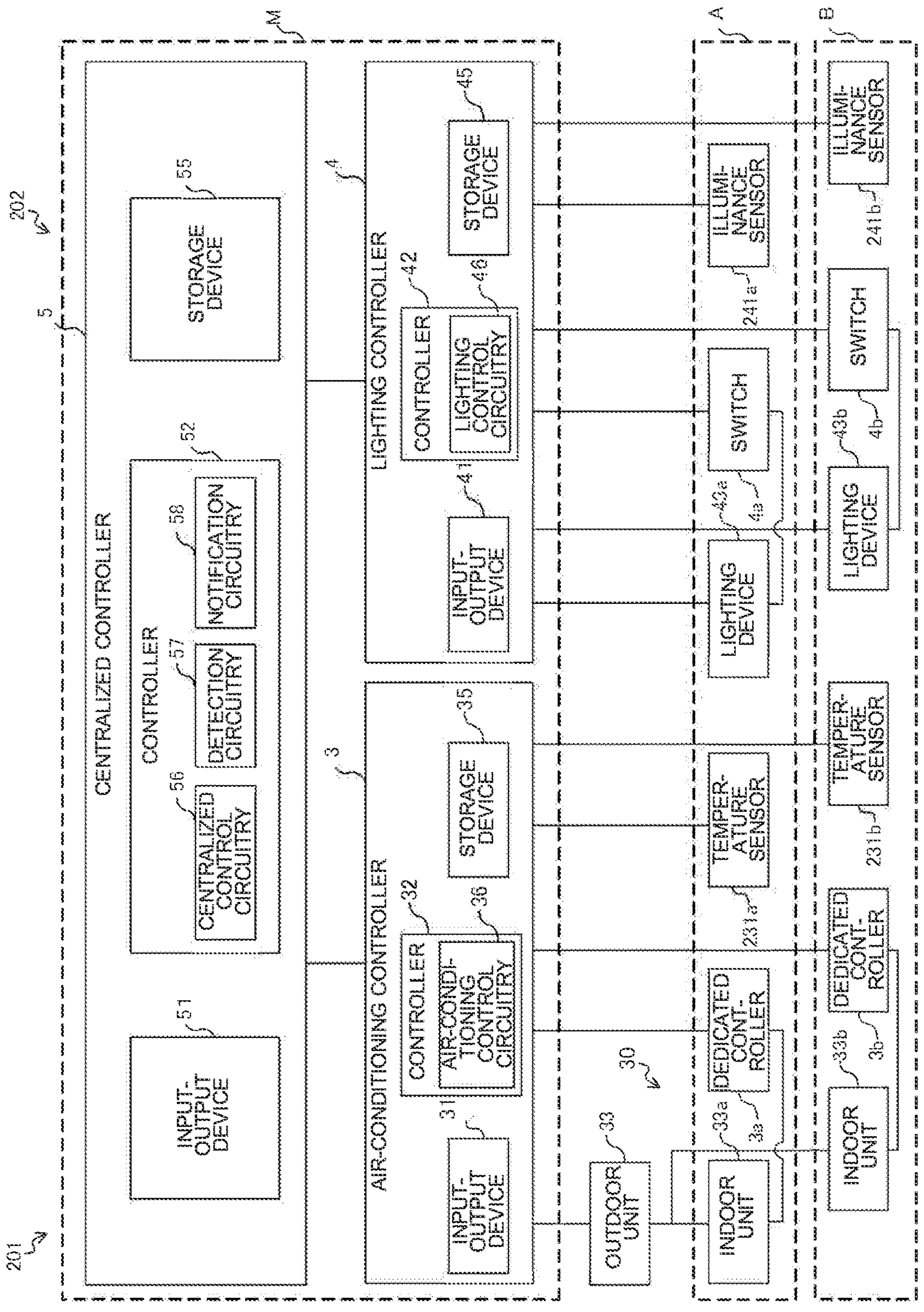
FIG. 8 is a block diagram illustrating a schematic configuration of an air-conditioning lighting system 201 according to Embodiment 3.

FIG. 8 is a block diagram illustrating a schematic configuration of an air-conditioning lighting system 201 according to Embodiment 3. The air-conditioning lighting system 201 of Embodiment 3 differs from that of Embodiment 1 in that temperature sensors 231*a* and 231*b* configured to measure temperatures of air-conditioning target spaces and illuminance sensors 241*a* and 241*b* configured to measure illuminances of illuminating target spaces are provided. The components in common with Embodiment 1 will be denoted by the same reference signs, and their descriptions will be omitted. Features different from Embodiment 1 will be mainly described below.

The temperature sensor 231*a* is provided in the indoor unit 33*a* to measure a suction temperature of the indoor unit 33*a*, that is, a room temperature of the room A. The temperature sensor 231*b* is provided in the indoor unit 33*b* to measure a suction temperature of the indoor unit 33*b*, that is, a room temperature of the room B. Each of the temperature sensors 231*a* and 231*b* is connected to the centralized controller 5 via a dedicated communication line or a LAN and transmits the measurement result to the centralized controller 5. Therefore, actual changes in temperature occurring in both rooms can be detected on the basis of the measurement results of the temperature sensors 231*a* and 231*b*.

The illuminance sensor 241*a* is provided in the room A to measure an illuminance of the room A. The illuminance sensor 241*b* is provided in the room B to measure an illuminance of the room B. Each of the illuminance sensors 241*a* and 241*b* is connected to the centralized controller 5 via a dedicated communication line or a LAN and transmits the measurement result to the centralized controller 5. Therefore, actual changes in illuminance occurring in both rooms can be detected on the basis of the measurement results of the illuminance sensors 241*a* and 241*b*.

In general, in air-conditioning lighting control systems, a setting error may occur in the air-conditioning map, which is used not only by the centralized controller but also by the air-conditioning controller, or the lighting map, which is used not only by the centralized controller but also by the lighting controller. That is, when an indoor unit of an air-conditioning apparatus has been registered in the air-conditioning map with an individual number belonging to another air-conditioning apparatus, it is not possible to determine from the air-conditioning log which air-conditioning apparatus is actually controlled. Similarly, when a lighting device has been registered in the lighting map with an individual number belonging to another lighting device, it is not possible to determine from the lighting log which lighting device is actually controlled.

In contrast, in Embodiment 3, actual changes in environment can be detected in both rooms on the basis of the measurement results of the temperature sensors 231*a* and 231*b*, and those of the illuminance sensors 241*a* and 241*b*. When the measurement results of the temperature sensors 231*a* and 231*b* indicate that there is a change in temperature in the room different from the room being controlled in the air-conditioning log, the detection circuitry 57 detects it as a setting error in the air-conditioning map. Similarly, when the measurement results of the illuminance sensors 241*a* and 241*b* indicate that there is a change in illuminance in the room different from the room being controlled in the lighting log, the detection circuitry 57 detects it as a setting error in the lighting map.

For example, when the air-conditioning log indicates that the operation of the indoor unit 33*a* of the room A has been started but the room temperature of the room B changes, the detection circuitry 57 determines that the setting of the air-conditioning map is wrong. In this case, it is considered that there may be an error in the individual number given to the indoor unit 33*a* or the identification number given to the room A.

Figure 9:
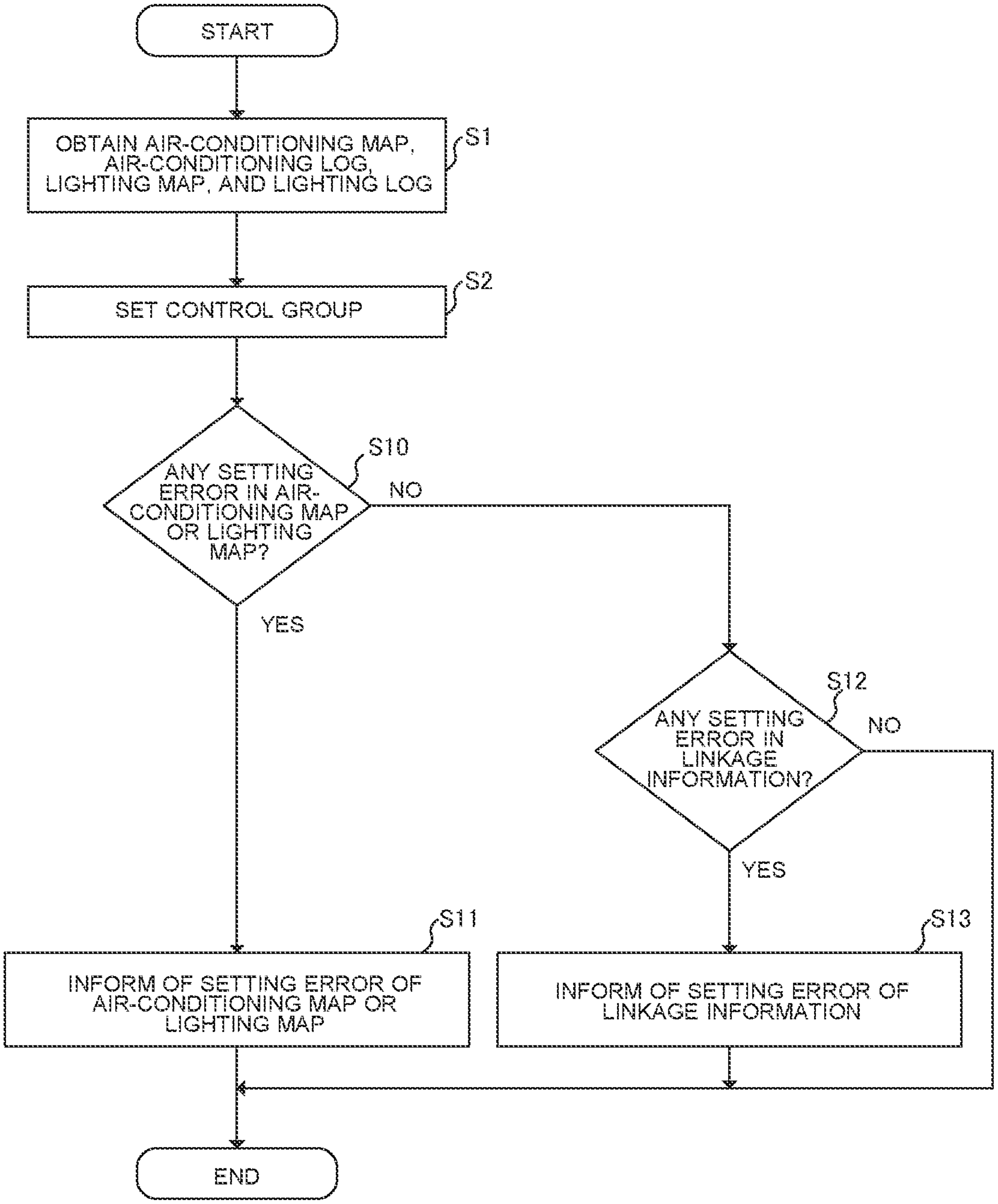
FIG. 9 is a flowchart illustrating an operation of the controller 52 of the centralized controller 5 according to Embodiment 3.

FIG. 9 is a flowchart illustrating an operation of the controller 52 of the centralized controller 5 according to Embodiment 3. The operation of the controller 52 of the centralized controller 5 will be described with reference to FIG. 9. Because S1 and S2 are the same as those in Embodiment 1, their descriptions will be omitted here. The detection circuitry 57 compares the measurement results of the temperature sensor 231*a* and the illuminance sensor 241*a* with the control results recorded in the air-conditioning log and the lighting log to determine whether or not a setting error is present in the air-conditioning map or the lighting map (S10). When the detection circuitry 57 determines that there is a setting error in the air-conditioning log or the lighting log (YES in S10), the notification circuitry 58 reports the setting error of the air-conditioning map or the lighting map (S11), and the processing is ended. When the detection circuitry 57 determines that there is no setting error in the air-conditioning map and the lighting map (NO in S10), the detection circuitry 57 determines whether or not a setting error corresponding to a detection pattern is present in the linkage information on the basis of the air-conditioning log and the lighting log stored in the storage device 55 (S12). When the detection circuitry 57 determines that there is a setting error in the linkage information (YES in S12), the notification circuitry 58 reports the setting error (S13), and the processing is ended. When the detection circuitry 57 determines that there is no setting error in the linkage information (NO in S12), the processing is ended.

According to Embodiment 3, when there is a change in the temperature in the room different from the room being controlled in the air-conditioning log on the basis of the measurement results of the temperature sensors 231*a* and 231*b*, the detection circuitry 57 of the air-conditioning lighting control system 202 and the air-conditioning lighting system 201 detects it as a setting error of the air-conditioning map. Similarly, when there is a change in the illuminance in the room different from the room being controlled in the lighting log on the basis of the measurement results of the illuminance sensors 241*a* and 241*b*, the detection circuitry 57 detects it as a setting error of the lighting map. Thus, by the air-conditioning lighting control system 202 and the air-conditioning lighting system 201, the convenience of the linkage function between the indoor units 33*a* and 33*b* of the air-conditioning apparatus 30 and the lighting devices 43*a* and 43*b* can be further improved.

Although the embodiments of the present disclosure are described above, the present disclosure is not limited to the configurations described above. Various modifications or combinations are conceivable within the scope of the technical concept of the present disclosure. For example, the air-conditioning lighting control system 202 of Embodiment 3, which is provided with the temperature sensors 231*a* and 231*b* and the illuminance sensors 241*a* and 241*b*, may be configured such that the centralized controller 5 can be used from the cloud. Although the centralized control circuitry 56, the detection circuitry 57, and the notification circuitry 58 of the centralized controller 5 are mounted in the cloud in one embodiment, the air-conditioning control circuitry 36 of the air-conditioning controller 3 and the lighting control circuitry 46 of the lighting controller 4 may be mounted in the cloud. Furthermore, only the function of the detection circuitry 57 may be mounted in the cloud. Moreover, the detection circuitry 57 may be formed as hardware separately from the centralized controller 5.

In addition, the centralized controller 5 may have correction circuitry configured to automatically correct a setting error. The correction circuitry is configured to correct the linkage information such that the linkage information corresponds to the same control group on the basis of the air-conditioning map and the lighting map.

Furthermore, when an air-conditioning target space is a conference room or a similar room for which a user can make a reservation for a scheduled time of usage, the detection circuitry 57 may be configured to obtain the scheduled time of usage. In this case, when the indoor unit 33*a* or 33*b* of the air-conditioning apparatus 30, or the lighting device 43*a* or 43*b* is operating at a time other than the scheduled time of usage, the detection circuitry 57 can detect that there is a setting error in the linkage information.

Moreover, in the embodiments, a case where one indoor unit 33*a* and one lighting device 43*a* are provided in one room is described. However, a plurality of indoor units and a plurality of lighting devices may be provided in one room. When a plurality of indoor units are provided in one room, an air-conditioning target space corresponds to the space to be air-conditioned by each indoor unit. Similarly, when a plurality of lighting devices are provided in one room, an air-conditioning target space corresponds to the space to be illuminated by each lighting device. In fact, an air-conditioning target space and an illuminating target space are not necessarily the same space. A plurality of air-conditioning target spaces may be provided while only one illuminating target space is provided, and vice versa.

In addition, in the embodiments, a case where one outdoor unit 33 is connected to the air-conditioning controller is described as an example. However, a plurality of outdoor units may be connected to the air-conditioning controller.

Furthermore, in Embodiment 1, the linkage information is used to set a linked operation of an on state and the off state between the indoor unit 33*a* and the lighting device 43*a*. However, either the on state or the off state may be set for the linked operation. For example, when only the off state of the indoor unit and the off state of the lighting device are linked, a setting error can be detected by using the above-mentioned first to third detection patterns. In addition, when only the on state of the indoor unit and the on state of the lighting device are linked, a setting error can be detected by using a detection pattern in which a setting error is detected under the condition, for example, that one of the indoor unit and lighting device does not enter the on state within a predetermined time period after the other indoor unit or lighting device enters the on state.

Moreover, in the embodiments, a case where the identification numbers of the air-conditioning target spaces and the individual numbers of the indoor units 33*a* and 33*b* are associated with each other and stored in the air-conditioned map is described. However, the air-conditioning map is not limited to this form as long as an air-conditioning target space and the air-conditioning apparatus 30 provided in the air-conditioning target space are indicated. The same applies to the lighting map.

In addition, in Embodiments 1 and 2, when a setting error of the linkage information is detected and reported and a user resets the linkage information and the same setting error of the linkage information is detected again, notification may be made indicating there is the setting error in the air-conditioning map or lighting map.

Furthermore, in Embodiment 3, an error of the linkage information is determined when a setting error of the air-conditioning map or lighting map is determined first but there is no setting error in the air-conditioning map or lighting map. However, the order of detecting a setting error is not limited to that described in Embodiment 3. For example, a setting error of the air-conditioning map or lighting map may be determined when a setting error of the linkage information is determined first and the setting error of the linkage information is detected. In fact, a setting error of the linkage information and a setting error of the air-conditioning map or lighting map may be detected independently.

Moreover, the detection circuitry 57 may compare the operating rate of air-conditioning of one room with that of another room for a predetermined time period on the basis of the air-conditioning log, and utilize the comparison result in a detection pattern. To utilize the comparison result in a detection pattern, the detection pattern may be modified, for example, such that, in a case where the operating rates drop in all rooms, the detection circuitry 57 does not determine that a setting error is present even when the indoor unit and the lighting device provided in the same room are not working in conjunction with each other. As a result, unnecessary notifications can be avoided, for example, in an intermediate season during which air-conditioning is less frequently used.

Although the temperature sensors 131*a* and 131*b* are provided in the respective indoor units 33*a* and 33*b*, the sensors may be provided at other indoor places. In addition, an outdoor temperature sensor may be installed to measure an outdoor temperature, and the outdoor temperature may be used in a detection pattern. To utilize the outdoor temperature in a detection pattern, the detection pattern may be modified, for example, such that, in a case where a difference between the indoor temperature and the outdoor temperature is less than a predetermined value, the detection circuitry 57 does not determine that a setting error is present even when the indoor unit and the lighting device provided in the same room are not working in conjunction with each other.

Moreover, the detection circuitry 57 may be configured to detect a setting error only when an event corresponding to a detection pattern occurs continuously and repeatedly. In addition, the detection circuitry 57 may be configured to detect a setting error by using a combination of a plurality of detection patterns. Furthermore, the detection circuitry 57 may be configured to detect a setting error for each reception of the air-conditioning log and the lighting log, instead of detecting at a predetermined time of a day.

Other than an air-conditioning apparatus or a lighting device, devices such as a dehumidifier, a humidifier, an air cleaner, and a fan may be made to operate in conjunction with each other, and the detection circuitry 57 may be configured to detect a setting error related to the linked operation.

Furthermore, a usage status of a projector, a display, including a large-sized television, or a similar device installed in, for example, a conference room may be used in a detection pattern. When the projector, the display, or a similar device is used, a device that does not emit light, such as an air-conditioning apparatus, may be operated while a lighting device is being turned off in some cases. Therefore, to utilize this factor in a detection pattern, the detection pattern is considered to be modified, for example, such that, in a case where the projector, the display, or a similar device is used in a room, the detection circuitry 57 does not determine that a setting error is present even when the lighting device provided in the same room is not turned on while the air-conditioning apparatus, or the dehumidifier, the humidifier, the air cleaner, or the fan described above is operating.

Moreover, in Embodiment 1, the air-conditioning lighting control system 2 is provided in the control room, and the dedicated controllers 3*a* and 3*b* and the switches 4*a* and 4*b* are provided in the respective rooms A and B. However, the air-conditioning lighting control system 2, the dedicated controllers 3*a* and 3*b*, and the switches 4*a* and 4*b* may be provided in any room or place, as appropriate. In fact, the dedicated controllers 3*a* and 3*b* and the switches 4*a* and 4*b* may be omitted in some facilities to which the air-conditioning lighting system 1 is applied.

REFERENCE SIGNS LIST

1: air-conditioning lighting system, 2: air-conditioning lighting control system, 3: air-conditioning controller, 3*a*: dedicated controller, 3*b*: dedicated controller, 4: lighting controller, 4*a*: switch, 4*b*: switch, 5: centralized controller, 30: air-conditioning apparatus, 31: input-output device, 32: controller, 33: outdoor unit, 33*a*: indoor unit, 33*b*: indoor unit, 35: storage device, 36: air-conditioning control circuitry, 41: input-output device, 42: controller, 43*a*: lighting device, 43*b*: lighting device, 45: storage device, 46: lighting control circuitry, 51: input-output device, 52: controller, 55: storage device, 56: centralized control circuitry, 57: detection circuitry, 58: notification circuitry, 101: air-conditioning lighting system, 102: air-conditioning lighting control system, 105: centralized controller, 140: terminal device, 152: controller, 165: storage device, 201: air-conditioning lighting system, 202: air-conditioning lighting control system, 231*a*: temperature sensor, 231*b*: temperature sensor, 241*a*: illuminance sensor, 241*b*: illuminance sensor

The invention claimed is:

1. An air-conditioning lighting control system comprising:

air-conditioning control circuitry configured to control an air-conditioning apparatus on the basis of an air-conditioning map indicating an air-conditioning target space and the air-conditioning apparatus provided in the air-conditioning target space;

lighting control circuitry configured to control a lighting device on the basis of a lighting map indicating an illuminating target space and the lighting device provided in the illuminating target space;

centralized control circuitry configured to communicate with the air-conditioning control circuitry and the lighting control circuitry and make the air-conditioning apparatus and the lighting device work in conjunction with each other on the basis of linkage information, which is set in advance, and in which the air-conditioning apparatus and the lighting device are linked with each other; and detection circuitry configured to detect that there is a setting error in the air-conditioning map, the lighting map, and the linkage information, the detection circuitry being configured to set, when the air-conditioning target space and the illuminating target space are the same space on the basis of the air-conditioning map and the lighting map, the air-conditioning apparatus provided in the air-conditioning target space and the lighting device provided in the illuminating target space into the same control group, wherein the setting error in the linkage information includes a condition in which the air-conditioning apparatus and the lighting device are not linked and a condition in which the air-conditioning apparatus and the lighting device in different spaces are linked.

2. The air-conditioning lighting control system of claim 1, wherein the detection circuitry is configured to determine an operation status of the air-conditioning apparatus and an operation status of the lighting device on the basis of an air-conditioning log indicating a result of control by the air-conditioning control circuitry and a lighting log indicating a result of control by the lighting control circuitry.

3. The air-conditioning lighting control system of claim 2, wherein the detection circuitry is configured to detect that there is a setting error in the linkage information when the air-conditioning apparatus and the lighting device that are set in the same control group stop at different timings.

4. The air-conditioning lighting control system of claim 2, wherein the detection circuitry is configured to detect that there is a setting error in the linkage information when the air-conditioning apparatus operates at a time other than a predetermined time set for the air-conditioning target space or when the lighting device operates at a time other than a predetermined time set for the illuminating target space.

5. The air-conditioning lighting control system of claim 2, wherein the centralized control circuitry is configured to obtain a scheduled time of usage at which a user makes a reservation for a room that is the air-conditioning target space or the illuminating target space, and the detection circuitry is configured to detect that there is a setting error in the linkage information when the air-conditioning apparatus or the lighting device operates at a time other than the scheduled time of usage.

6. The air-conditioning lighting control system of claim 2, further comprising a temperature sensor is configured to measure a temperature of the air-conditioning target space, wherein the detection circuitry is configured to determine an operation status of the air-conditioning apparatus on the basis of a measurement result of the temperature sensor, and detect a setting error of the air-conditioning map on the basis of the air-conditioning log and the measurement result of the temperature sensor.

7. The air-conditioning lighting control system of claim 2, further comprising an illuminance sensor is configured to measure an illuminance of the air-conditioning target space, wherein the detection circuitry is configured to determine an operation status of the lighting device on the basis of a measurement result of the illuminance sensor, and detect a setting error of the lighting map on the basis of the lighting log and the measurement result of the illuminance sensor.

8. The air-conditioning lighting control system of claim 1, further comprising notification circuitry configured to report a setting error in setting detected by the detection circuitry.

9. The air-conditioning lighting control system of claim 1, further comprising:

an air-conditioning controller having the air-conditioning control circuitry;

a lighting controller having the lighting control circuitry; and a centralized controller having the centralized control circuitry and configured to control the air-conditioning controller and the lighting controller.

10. The air-conditioning lighting control system of claim 9, wherein the detection circuitry is provided in a cloud outside of the air-conditioning controller and the lighting controller.

11. An air-conditioning lighting system comprising:

the air-conditioning apparatus;

the lighting device; and the air-conditioning lighting control system of claim 1.

12. An air-conditioning lighting control system comprising:

air-conditioning control circuitry configured to control an air-conditioning apparatus on the basis of an air-conditioning map indicating an air-conditioning target space and the air-conditioning apparatus provided in the air-conditioning target space;

lighting control circuitry configured to control a lighting device on the basis of a lighting map indicating an illuminating target space and the lighting device provided in the illuminating target space;

centralized control circuitry configured to communicate with the air-conditioning control circuitry and the lighting control circuitry and make the air-conditioning apparatus and the lighting device work in conjunction with each other on the basis of linkage information, which is set in advance, and in which the air-conditioning apparatus and the lighting device are linked with each other; and detection circuitry configured to detect that there is a setting error in the air-conditioning map, the lighting map, or the linkage information, the detection circuitry being configured to set, when the air-conditioning target space and the illuminating target space are the same space on the basis of the air-conditioning map and the lighting map, the air-conditioning apparatus provided in the air-conditioning target space and the lighting device provided in the illuminating target space into the same control group, wherein the detection circuitry is configured to determine an operation status of the air-conditioning apparatus and an operation status of the lighting device on the basis of an air-conditioning log indicating a result of control by the air-conditioning control circuitry and a lighting log indicating a result of control by the lighting control circuitry, and wherein the detection circuitry is configured to detect that there is a setting error in the linkage information when the air-conditioning apparatus and the lighting device that are set in the same control group stop at different timings, and the air-conditioning apparatus set in the same control group and an other lighting device that is not set in the same control group stop at the same timing.

* * * * *